US008974959B2

(12) United States Patent
Thackeray et al.

(10) Patent No.: US 8,974,959 B2
(45) Date of Patent: Mar. 10, 2015

(54) MULTI-COMPONENT INTERMETALLIC ELECTRODES FOR LITHIUM BATTERIES

(75) Inventors: Michael M. Thackeray, Naperville, IL (US); Lynn Trahey, Clarendon Hills, IL (US); John T. Vaughey, Elmhurst, IL (US)

(73) Assignee: UChicago Argonne, LLC, Chicago, IL (US)

( * ) Notice: Subject to any disclaimer, the term of this patent is extended or adjusted under 35 U.S.C. 154(b) by 993 days.

(21) Appl. No.: 12/460,277

(22) Filed: Jul. 16, 2009

(65) Prior Publication Data

US 2010/0035153 A1    Feb. 11, 2010

Related U.S. Application Data

(60) Provisional application No. 61/135,046, filed on Jul. 16, 2008.

(51) Int. Cl.

| *H01M 4/58* | (2010.01) |
|---|---|
| *H01M 4/134* | (2010.01) |
| *H01M 4/1395* | (2010.01) |
| *H01M 4/38* | (2006.01) |
| *H01M 4/04* | (2006.01) |
| *H01M 4/66* | (2006.01) |
| *H01M 4/74* | (2006.01) |
| *H01M 10/052* | (2010.01) |
| *H01M 10/0565* | (2010.01) |
| *H01M 4/02* | (2006.01) |
| *H01M 10/42* | (2006.01) |

(52) U.S. Cl.
CPC .............. *H01M 4/1395* (2013.01); *H01M 4/38* (2013.01); *H01M 4/382* (2013.01); *H01M 4/0438* (2013.01); *H01M 4/134* (2013.01); *H01M 4/661* (2013.01); *H01M 4/74* (2013.01); *H01M 10/052* (2013.01); *H01M 10/0565* (2013.01); *H01M 2004/021* (2013.01); *H01M 2010/4292* (2013.01); *Y02E 60/122* (2013.01); *Y02T 10/7011* (2013.01)
USPC ........................................ 429/218.1; 429/209

(58) Field of Classification Search
CPC ...... H01M 4/1395; H01M 4/38; H01M 4/382
USPC ........................................ 429/219, 209, 218.1
See application file for complete search history.

(56) References Cited

U.S. PATENT DOCUMENTS

| 6,030,726 | A | 2/2000 | Takeuchi et al. | |
|---|---|---|---|---|
| 6,203,944 | B1 | 3/2001 | Turner et al. | |
| 6,528,208 | B1 | 3/2003 | Thackeray et al. | |
| 6,855,460 | B2 | 2/2005 | Vaughey et al. | |
| 6,916,581 | B2 | 7/2005 | Tamura et al. | |
| 7,122,279 | B2 | 10/2006 | Tamura et al. | |
| 2002/0136953 | A1* | 9/2002 | Vaughey et al. | ........... 429/218.1 |
| 2004/0058248 | A1* | 3/2004 | Inoue | ............................. 429/235 |
| 2004/0219432 | A1* | 11/2004 | Kojima et al. | ........... 429/231.95 |
| 2007/0111094 | A1* | 5/2007 | Thackeray et al. | ........ 429/218.1 |

OTHER PUBLICATIONS

Nam et al., "Electrochemical synthesis of a three-dimensional porous Sb/Cu2Sb anode for Na-ion batteries", Journal of Power Sources, 247 (2014) 423-427.*
S.D. Beattie et al., Single Bath, Pulsed Electrodeposition . . . Electrodes for Lithium-Ion Batteries, Jour. of the Electrochemical Soc. 150(7) A894-A898 (2003).
X. Fan et al., Microspherical Cu6Sn5 Alloy Anode for Lithium-Ion Battery, Electrochemical and Solid State Letters, 11 (11) A195-A197 (2008).
A. Finke et al., Characterization and Li Reactivity of Electrodeposited . . . Spontaneous Current Oscillations, Journal of the Electrochemical Soc., 152(12) A2364-A2368 (2005).
T. Jiang et al., Preparation and Characterization of Tin-Based Three-Dimensional Cellular Anode for Lithium Ion Battery, Journal of Power Sources 166 (2007) 503-508.
R. Juskenas et al., XRD Studies of the Phase Composition of the Electrodeposited Copper-rich Cu-Sn Alloys, Electrochimica Acta 52 (2006) 928-935.
F. Ke et al., Electroplating Synthesis and Electrochemical Properties of Macroporous Sn-Cu Alloy Electrode for Lithium-Ion Batteries, Electrochimica Acta 52 (2007) 6741-6747.
W. Pu et al., Electrodeposition of Sn-Cu Alloy Anodes for Lithium Batteries, Electrochimica Acta 50 (2005) 4140-4145.
N. Tamura et al., Study on the Anode Behavior of Sn and Sn-Cu Alloy Thin Film Electrodes, Journal of Power Sources 107 (2002) 48-55.
N. Tamura et al., Advanced Structures in Electrodeposited Tin Base Negative Electrodes . . . Secondary Batteries, Journal of the Electrochemical Society, 150(6),A679-A683 (2003).
K.D. Kepler et al., LixCu6Sn5 . . . Electrode for Rechargeable Lithium Batteries, Electrochemical and Solid State Letters, 2 (7) 307-309 (1999).
L. Fransson et al., Structural Transformations in Lithiated . . . Spectroscopy and X-ray Diffraction, Jour. of the Electro. Soc. 149(6) A736-A742 (2002).
L.M.L. Fransson et al., Phase Transitions in Lithiated . . . An In Situ X-ray Diffraction Study, Electrochemistry Communications 3 (2001) 317-323.
M.M. Thackeray et al., Structural Considerations of Intermetallic Electrodes for Lithium Batteries, Journal of Power Source 113 (2003) 124-130.

* cited by examiner

*Primary Examiner* — Muhammad Siddiquee
(74) *Attorney, Agent, or Firm* — Olson & Cepuritis, Ltd.

(57) ABSTRACT

Multi-component intermetallic negative electrodes prepared by electrochemical deposition for non-aqueous lithium cells and batteries are disclosed. More specifically, the invention relates to composite intermetallic electrodes comprising two or more compounds containing metallic or metalloid elements, at least one element of which can react with lithium to form binary, ternary, quaternary or higher order compounds, these compounds being in combination with one or more other metals that are essentially inactive toward lithium and act predominantly, but not necessarily exclusively, to the electronic conductivity of, and as current collection agent for, the electrode. The invention relates more specifically to negative electrode materials that provide an operating potential between 0.05 and 2.0 V vs. metallic lithium.

19 Claims, 13 Drawing Sheets

(a) As-deposited Cu foam  (b) Annealed Cu foam (500 °C)  (c) Cu$_6$Sn$_5$/Sn on Cu foam

MULTI-COMPONENT INTERMETALLIC ELECTRODES FOR LITHIUM BATTERIES

CROSS-REFERENCE TO RELATED APPLICATIONS

This application claims the benefit of U.S. Provisional Application Ser. No. 61/135,046, filed on Jul. 16, 2008, which is incorporated herein by reference in its entirety.

CONTRACTUAL ORIGIN OF THE INVENTION

The United States Government has rights in this invention pursuant to Contract No. W-31-109-ENG-38 between the U.S. Department of Energy and The University of Chicago and/or pursuant to Contract No. DE-AC02-06CH11357 between the United States Government, U.S. Department of Energy and UChicago Argonne, LLC representing Argonne National Laboratory.

FIELD OF THE INVENTION

This invention relates to intermetallic negative electrodes for non-aqueous lithium cells and batteries. The electrodes are of particular use in rechargeable lithium-ion batteries that power widespread applications such as portable electronic devices (for example, cell phones and laptop computers), medical-, space-, aeronautic- and defense-related devices and in transportation applications, such as electric and hybrid-electric vehicles.

SUMMARY OF THE INVENTION

This invention relates to multi-component intermetallic negative electrodes for non-aqueous lithium cells and batteries. More specifically, the invention relates to composite intermetallic electrodes, formed by an electrochemical deposition process that comprise two or more metal or metalloid elements, M(1), M(2), M(3) . . . etc., at least one of which can react with lithium to form binary $Li_xM(1)$, ternary $Li_xM(1)M(2)$, quaternary $Li_xM(1)M(2)M(3)$ or higher order compounds, these compounds being in combination with one or more other metals that are essentially inactive toward lithium and act predominantly, but not necessarily exclusively, to the electronic conductivity of, and as current collection agent for, the electrode. The invention relates more specifically to negative electrode materials electrochemically deposited onto porous metallic foam current collectors, the electrodes providing an operating potential preferably of about 0.05 to about 2.0 V vs. metallic lithium, more preferably about 0.2 to about 1.5 V vs. metallic lithium and most preferably about 0.4 to about 1.2 V vs. metallic lithium. The electrodes are of particular use for rechargeable lithium-ion batteries in widespread applications such as portable electronic devices (cell phones and laptop computers), medical devices, space, aeronautical and defense-related devices and in transportation applications such as all-electric-, hybrid-electric-, and plug-in hybrid-electric vehicles.

BRIEF DESCRIPTION OF THE DRAWINGS

The invention consists of certain novel features and a combination of parts hereinafter fully described, illustrated in the accompanying drawing, and particularly pointed out in various aspects of the invention, it being understood that various changes in the details may be made without departing from the spirit, or sacrificing any of the advantages of the described invention.

DETAILED DESCRIPTION OF PREFERRED EMBODIMENTS

This invention relates to intermetallic negative electrodes for non-aqueous lithium cells and batteries. More specifically, the invention relates to composite intermetallic electrodes, formed by an electrochemical deposition process, which comprise two or more metal or metalloid elements, M(1), M(2), M(3) . . . etc., at least one of which can react with lithium to form binary $Li_xM(1)$, ternary $Li_xM(1)M(2)$, quaternary $Li_xM(1)M(2)M(3)$ or higher order compounds, these compounds being in combination with one or more other metals that are essentially inactive toward lithium and act predominantly, but not necessarily exclusively, to the electronic conductivity of, and as current collection agent for, the electrode. The invention relates more specifically to negative electrode materials, electrochemically deposited onto porous metal foam current collectors, the electrodes providing an operating electrochemical potential preferably of about 0.05 to about 2.0 V vs. metallic lithium, more preferably about 0.2 to about 1.5 V vs. metallic lithium and most preferably about 0.4 to about 1.2 V vs. metallic lithium. The electrochemically deposited components of the composite electrodes of the invention may, individually, be comprised of materials that are either crystalline to X-rays, poorly crystalline to X-rays or amorphous to X-rays. The structures of the crystalline and poorly crystalline components may either be ordered, fully disordered or partially disordered. The electrodes are of particular use for rechargeable lithium-ion batteries in widespread applications such as portable electronic devices (cell phones and laptop computers), medical devices, space, aeronautical and defense-related devices and in transportation applications such as all-electric-, hybrid-electric-, and plug-in hybrid-electric vehicles.

Metals (M) that are 'active' with respect to lithium are those that react with lithium to form binary compounds $Li_xM$ where x falls typically within the range $0<x<5$. Preferred examples of such metals are Al, Ag, Mg, In, Pb, Sn and Zn. Metalloids or semi-metals, such as antimony, Sb, and silicon, Si, are included in this invention because they can react readily to form binary compounds with lithium to compositions $Li_3Sb$ and $Li_{4.4}Si$, respectively. 'Inactive' metals are those that do not react significantly or readily with lithium, examples being, Ti, V, Fe, Mn, Ni, Co, and Cu; in one embodiment of this invention, the inactive metals are selected preferably from one or more of Ni, Co, and Cu.

The principles of the invention are described with respect to the following example. In a second embodiment of the invention, the electrode in its fully delithiated state, may be comprised of a three component system of Cu, Sn and Sb, in which several binary phases are known to exist, for example, $Cu_6Sn_5$, $Cu_3Sn$, $Cu_2Sb$, and SnSb. Ternary compounds in the Cu—Sn—Sb system have been identified in mineral form, such as $CuSn_{0.9}Sb_{0.1}$ (sorosite) with $P6_3/mmc$ symmetry, as described in the Inorganic Crystal Structure Database (ICSD). In Cu—Sn—Sb electrodes, the Sn and Sb components are 'active' toward lithium, i.e., they react with lithium to form binary $Li_xSn$ ($x_{max} \approx 4$) compounds and $Li_xSb$ compounds, for example, $Li_2Sb$ and $Li_3Sb$. On the other hand, lithium can react with the binary copper-tin and copper antimonide compounds to yield ternary structures. For example, it has been reported by Kepler et al. in Electrochemical and Solid State Letters, Volume 2, page 307 (1999) that $Cu_6Sn_5$ reacts electrochemically with lithium for form $Li_2CuSn$. Fransson et al. have reported in Electrochemistry Communications, Volume 3, page 317 (2001) that lithium reacts electrochemically with $Cu_2Sb$ to form $Li_2CuSb$. During these electrochemical processes, copper is extruded at least partially from the $Cu_6Sn_5$ and $Cu_2Sb$ structures and therefore can act to enhance the electronic conductivity between the active Sn- and Sb-containing electrode particles of the Cu—Sn—Sb electrode. A copper metal foil onto which the $Cu_6Sn_5$ and $Cu_2Sb$ powders can be laminated is customarily used as the current collector and connector to the external circuit, particularly when such materials are used as the negative electrodes in lithium-ion cells and batteries.

In a particular embodiment of the invention, the electrode may be comprised of $Cu_6Sn_5$ and $Cu_2Sb$ precursor compounds, that when present in the electrode in a 1:5 ratio yield the electrode composition $Cu_6Sn_5.5Cu_2Sb$. Reaction of lithium with $Cu_2Sb$ occurs at approximately 900-700 mV vs. metallic lithium, whereas the reaction of lithium with $Cu_6Sn_5$ occurs at lower potentials, typically about 400 to about 100 mV vs. lithium. The advantage of such a multi-component electrode is that it is possible to tailor the amount Sn and Sb in the electrode such that the operating voltage of the cell is kept sufficiently above the lithium potential, thereby reducing the safety hazards of the lithium cells. Based on the known electrochemical behavior of independent $Cu_6Sn_5$ and $Cu_2Sb$ as reported by Kepler et al. and Fransson et al., the electrochemical reaction of a $Cu_6Sn_5.5Cu_2Sb$ electrode for the complete extrusion of Cu can be construed to occur as follows:

15Li+Cu$_6$Sn$_5$.5Cu$_2$Sb→Cu$_6$Sn$_5$.5Li$_3$Sb+10Cu (900-700 mV)

20Li+Cu$_6$Sn$_5$.5Li$_3$Sb→5Li$_4$Sn.5Li$_3$Sb+6Cu (400-100 mV)

Net Reaction: 35Li+Cu$_6$Sn$_5$.5Cu$_2$Sb→5Li$_4$Sn.5Li$_3$Sb+16Cu

The capacity of the $Cu_6Sn_5.5Cu_2Sb$ electrode for the net reaction above is about 423 mAh/g, which is slightly greater than the theoretical gravimetric capacity of a standard graphite ($C_6$) electrode (372 mAh/g). The gravimetric capacity of the $Cu_6Sn_5.5Cu_2Sb$ electrode translates to a volumetric capacity in excess of about 2000 mAh/ml, if the density of the Cu—Sn—Sb electrode, that varies on reaction with lithium, remains above about 5 gm/ml—i.e., considerably greater than the theoretical volumetric capacity of graphite (818 mAh/ml). Although the reactions of independent $Cu_6Sn_5$ and $5Cu_2Sb$ electrodes have been shown to be reversible, this reversibility, in general, does not persist on repeated cycling of the cells. The advantage of the reaction of the $Cu_6Sn_5.5Cu_2Sb$ composite electrode of the present invention is that even if the copper does not participate in the reverse reaction, complete extraction of lithium from the $5Li_4Sn.5Li_3Sb$ electrode will yield an electrode with composition SnSb that is embedded within an electronically-conducting Cu matrix. In practice, however, it is believed that there is partial reincorporation of copper into the composite electrode component structures during electrochemical cycling. Thus the electrodes of the invention have highly complex macro- and microstructures with varying composition and atomic distributions—it is believed that the interaction between the various atomic species and the ability to form binary, ternary and higher order compounds, enables the metal constituents to act as structural binding agents, thereby contributing to the integrity of the composite electrodes and, together with the surrounding copper matrix, to the maintenance of electronic connectivity between individual particles during repeated charge and discharge, thus allowing for the design of binderless electrodes. It has been discovered, in particular, in accordance with the principles of this invention, that significantly improved electrochemical behavior can be achieved from the multi-component electrodes if they are fabricated by electrochemical deposition onto a three-dimensional, porous metal foam substrate, such as a porous copper-foam substrate that is adhered to a copper foil substrate. The principles of the invention extend to other inactive, porous metal foam substrates, such as nickel foam substrates or alloys formed therefrom.

In order to achieve high capacities and high current rates, the primary electrode particles of the composite multi-component electrodes should preferably be as small as possible, with nanodimensions, on average, less than about 1000 nm, preferably less than about 500 nm, and most preferably less than about 100 nm, in size. Furthermore, it is well known in the art that good electronic conductivity between electrode particles should be maintained at all times during cell and battery operation. To this extent, the intermetallic electrodes may optionally also include, with the porous foam, an optimum amount of additional current collecting media, such as carbon (for example, acetylene black), metal or metal alloy powders, electronically conducting polymers, and the like.

Broadly speaking, therefore, this invention relates to negative electrodes for non-aqueous lithium cells, the electrodes comprising a multi-component material electrodeposited onto a porous metal foam current collector, the electrode material containing at least one metal element or silicon that can react with lithium to form a binary, ternary, quaternary or higher order compound, and one or more additional metallic elements or silicon. The following examples describe the broad principles of the invention as contemplated by the inventors, but they are not to be construed as limiting examples.

EXAMPLE 1

Reference Cu—Sn—Sb electrode are synthesized typically by reacting elemental copper, tin and antimony together, for example, either by high energy ball milling, attritor milling, electrochemical deposition or by sputtering techniques using an Sn:Sb ratio that is approximately, or equal to, 1:1 and using Cu:Sn and Cu:Sb ratios greater than about 1:1. Such an electrode can be prepared, for example, by reacting or electrochemically depositing $Cu_6Sn_5$ and $Cu_2Sb$ in a 1:5 ratio such that the Cu:Sn:Sb ratio in the initial electrode is about 16:1:1.

Electrochemical test cells for evaluating laminated electrodes are constructed in the following typical manner. The laminates of the electrodes are fabricated typically by mixing about 84 wt % intermetallic material with about 8 wt % carbon (acetylene black) to aid electronic conductivity between individual intermetallic particles, and about 8 wt % polyvinylidine difluoride binder (PVDF). The electrode slurry is extruded onto copper-foil, or alternatively impregnated into a porous copper foam current collector and vacuum-dried at approximately 120° C. for at least about 5 hours prior to use. Two-electrode cells are assembled in an argon filled glove-box ($O_2$ and $H_2O$ <5 ppm) using the laminated intermetallic electrode as the working electrode and lithium as the counter electrode, separated by a porous polyethylene oxide membrane soaked in electrolyte, such as 1M $LiPF_6$ in ethylene carbonate (EC)/diethyl carbonate (DEC) (2:1). The operating cell potential, capacities delivered by the electrodes and cycling efficiencies are obtained by cycling the electrodes typically within the range of about 1.5-0.0 V vs. metallic lithium.

EXAMPLE 2

Figure 1:
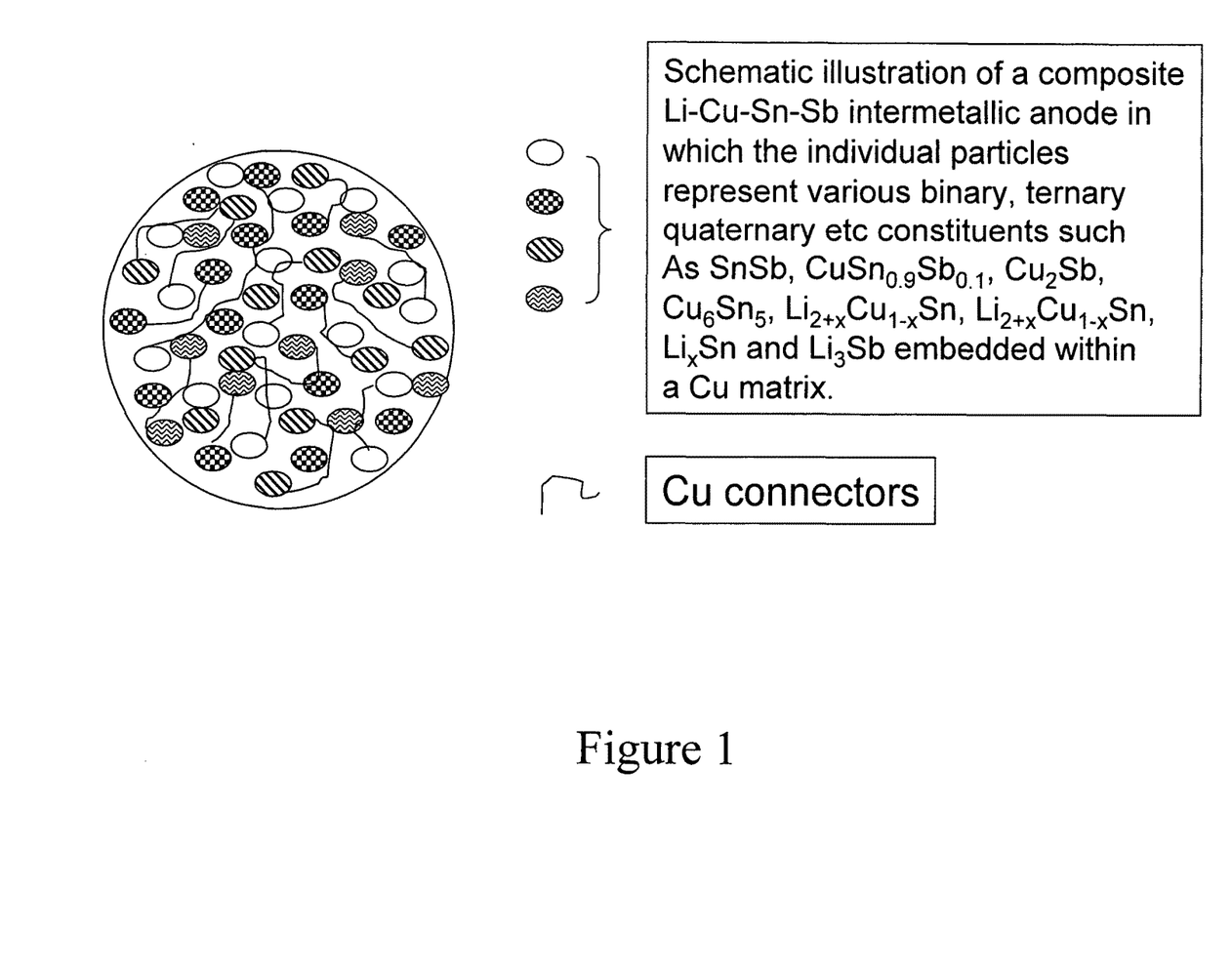
FIG. 1 depicts a schematic representation of a partially charged or discharged intermetallic electrode of this invention consisting of four components comprised of Li, Sn, Sb and Cu that during charge and discharge of an electrochemical lithium cell yields a composite electrode comprised of multiple constituents, such as binary SnSb, $Li_xSn$ and $Li_xSb$ compounds, ternary $CuSn_{0.9}Sb_{0.1}$, $Li_{2+x}Cu_{1-x}Sn$ and $Li_{2+x}Cu_{1-x}Sb$ compounds and possible higher order compounds, in which the Cu atoms also serve, at least in part, as an agent to enhance the electronic conductivity and current collection of the electrode.
Figure 2:
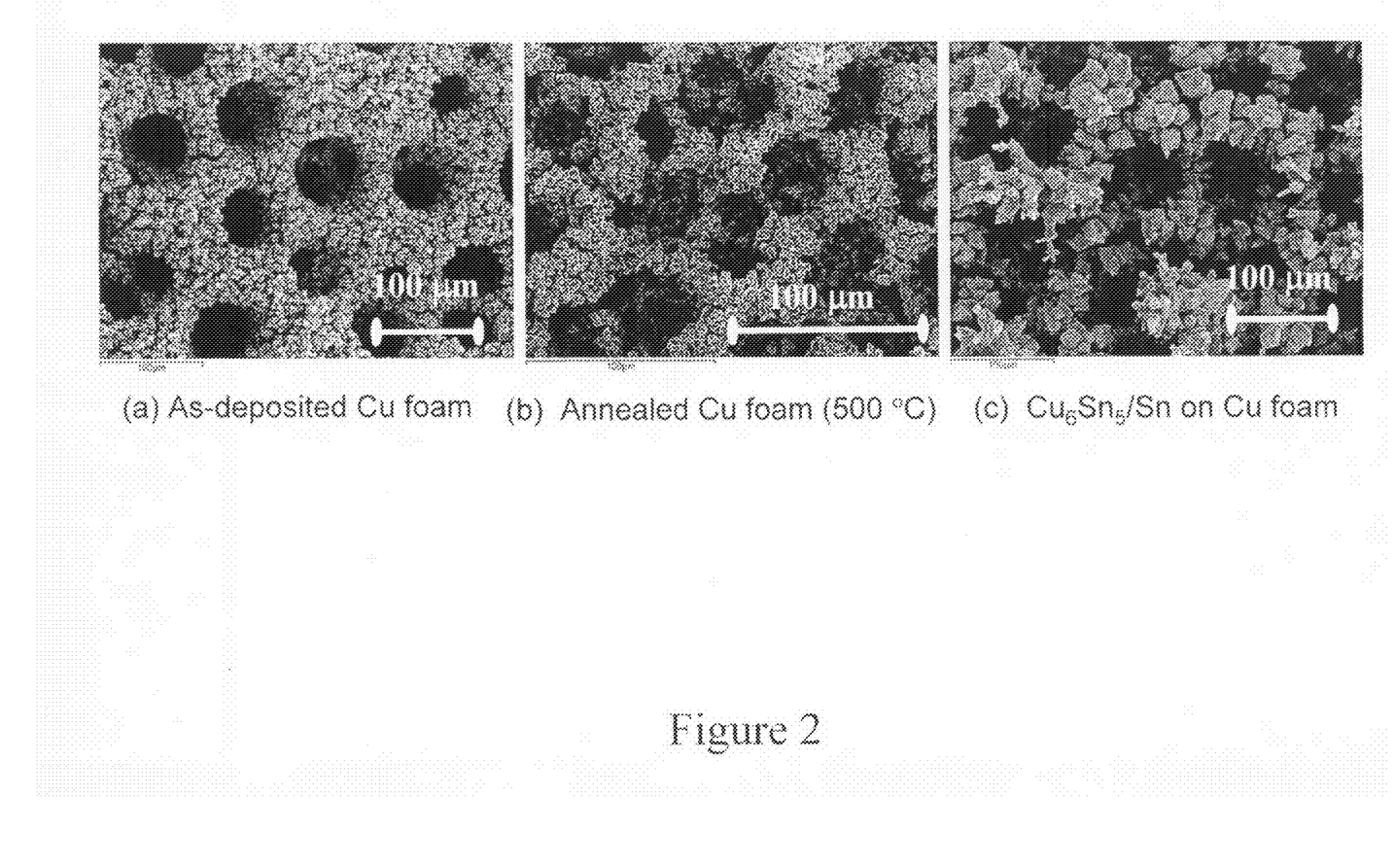
FIG. 2 depicts (a) a porous copper foam current-collector created by the electrochemical deposition of copper on copper foil substrate; (b), the copper foam current collector after annealing in argon at 500° C.; and (c) a $Cu_6Sn_5$/Sn electrode formed by electrodeposition of Cu and Sn on the copper foam current collector in (b).

Copper foam current collectors were fabricated on copper foil substrates by electrodeposition following a technique described by Shin et al. in Advanced Materials, Volume 15, page 1610 (2003). The deposition solution consisted of 0.2 M $CuSO_4.5H_2O$ and 1.5 M $H_2SO_4$. The counter electrode was copper gauze and the applied current was about −1.33 A. Depositions were performed for about 70 seconds at room temperature without stirring. The resulting copper foam, shown in a scanning electron microscopy (SEM) image in FIG. 2a, was sintered at about 500° C. for about 45 hours in an argon atmosphere to create a robust, three-dimensional, current collecting copper substrate (FIG. 2b). The substrate was subsequently weighed on a microbalance (Cahn C-33) prior to copper and tin deposition.

Figure 3:
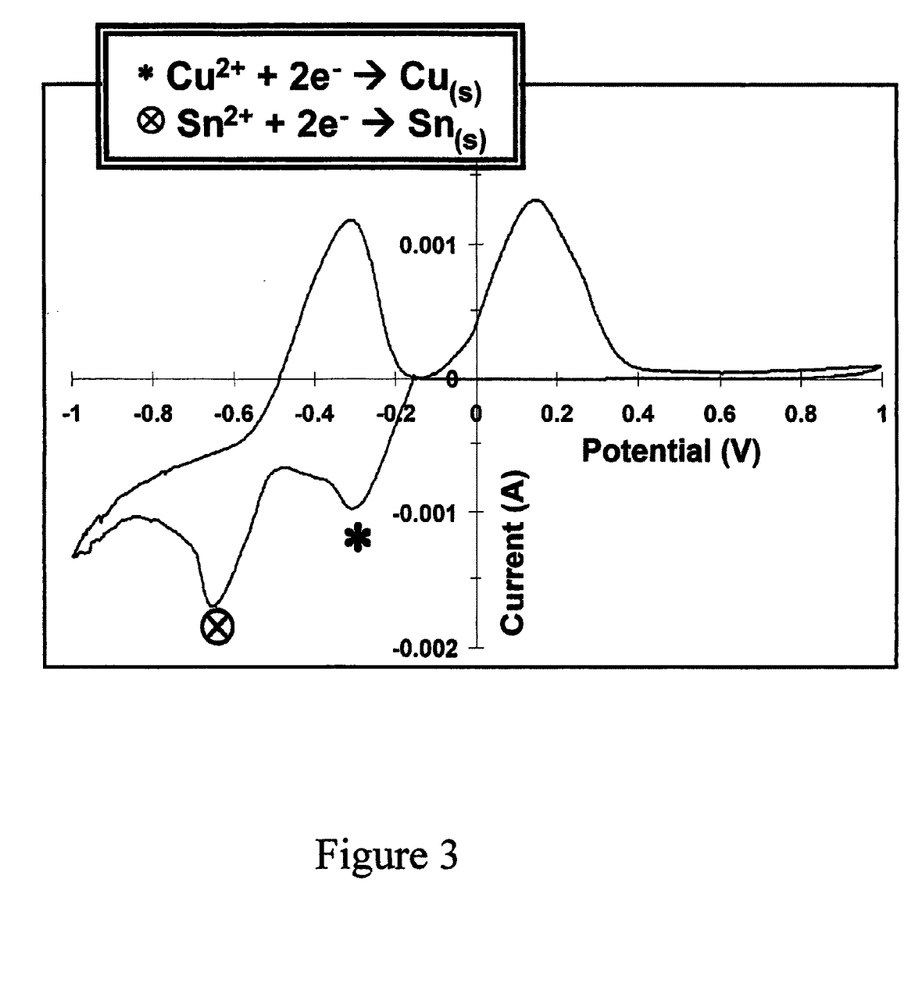
FIG. 3 depicts a cyclic voltammogram of a 1:1 0.05 M $CuCl_2$:0.05 M $SnCl_2$ solution in 10 vol. % HCl obtained at room temperature (SCE reference electrode, 50 mV/s scan rate).

For the electrodeposition of copper-tin electrodes, the reduction potentials of divalent copper and tin were first determined at room temperature by cyclic voltammetry (CV) in a solution of 0.05M $CuCl_2.2H_2O$ and 0.05 M $SnCl_2$ with 10 vol. % HCl to stabilize the solvated tin cations (FIG. 3). The CV experiments were performed using an electrochemical cell with a Pt disc working electrode, a Pt gauze counter electrode, and a saturated calomel reference electrode (SCE); a sweep rate of about 50 mV/s was employed. The solutions for the deposition of $Cu_6Sn_5$-Sn films on copper-foam substrates consisted of 0.002 M $CuCl_2.2H_2O$, 0.2 M $SnCl_2$, and 12 vol. % HCl. The films were deposited at about −600 mV vs. SCE using the following potential square wave within scanner-loop program: [Step 1: 0 V vs. open circuit potential (OCP), 50 ms; Step 2: −600 mV vs. SCE, 100 ms; Step 3: 0 V vs. OCP, 50 ms; Step 4: OCP monitoring, 3 s]. This procedure was carried out 400 times for each film deposition. All depositions were carried out using a PAR 273A potentiostat/galvanostat with Corrware software. Depositions were made, while stirring the solutions, on stainless steel-, copper foil-, and sintered copper foam substrates at room temperature (see FIG. 2c). The coated substrates were subsequently annealed at about 150° C. in argon for about 100 hours and weighed to determine the mass of the deposited copper-tin material. For the electrochemical coin cell experiments, the mass of the active copper-tin material ($Cu_6Sn_5$+Sn) was determined to be about 120 µg.

Figure 4:
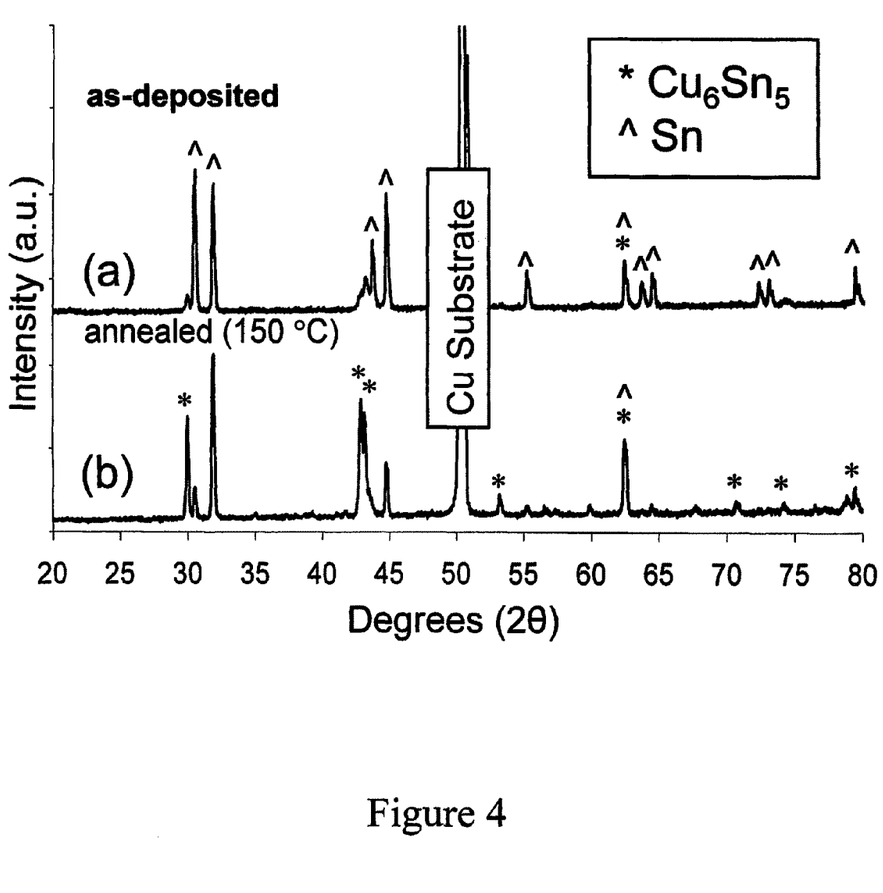
FIG. 4 depicts the X-ray diffraction patterns of copper-tin and tin products electrodeposited onto a copper foil substrate from a 0.002 M $CuCl_2 \cdot 2H_2O$, 0.2 M $SnCl_2$, and 12 vol. % HCl solution—(a) as-deposited (not annealed) and (b) annealed at 150° C.

The X-ray diffraction (XRD) patterns (Cu Kα radiation) of the copper-tin electrodes before (as-deposited) and after annealing are shown in FIGS. 4a and b, respectively. The copper peaks in the X-ray diffraction patterns in FIGS. 4a and b were due solely to the copper foil, not electrodeposited copper, because the corresponding X-ray diffraction patterns of $Cu_6Sn_5$–Sn products obtained by electrodeposition from the same solution on a stainless steel substrate were observed to be essentially identical to those deposited on copper foil in terms of both overall composition and crystallinity, and showed no evidence of any copper metal. Annealing the product at about 150° C. under argon increased the crystallization of the $Cu_6Sn_5$ component significantly, as evident from the growth and improved resolution of the $Cu_6Sn_5$ XRD peaks in FIG. 4b.

Figure 5A:
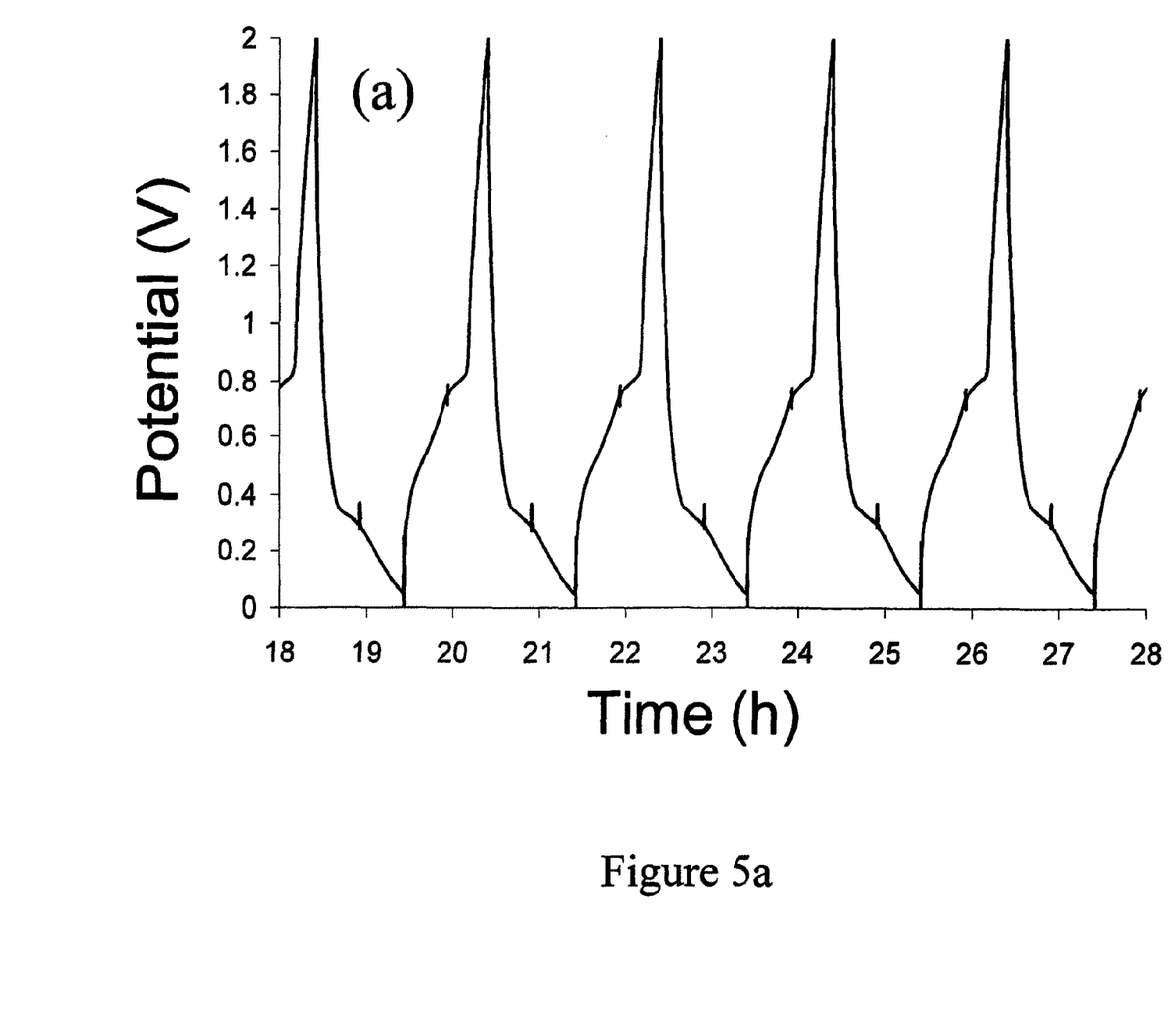
FIG. 5 depicts (a) the 8th through 12th charge/discharge profiles of an electrochemical lithium cell with a lithium metal electrode and an electrodeposited $Cu_6Sn_5$/Sn counter electrode formed by electrodeposition of Cu and Sn on a copper foam current collector, and (b) a capacity vs. cycle number plot of the cell in (a).

The electrodeposited $Cu_6Sn_5$–Sn electrodes were assembled and evaluated in coin cells (size 2032) containing a metallic lithium counter electrode, a Celgard separator, and 1.2 M $LiPF_6$ in ethylene carbonate/ethyl methyl carbonate (about 3:7 w/w) electrolyte. Typically, the coin cells were cycled galvanostatically at about 0.08 mA from about 0-2 V at room temperature. FIG. 5 depicts (a) a representative charge/discharge profile of an electrochemical lithium cell with a lithium metal electrode and an electrodeposited $Cu_6Sn_5$/Sn counter electrode formed by electrodeposition of Cu and Sn on a copper foam current collector, and (b) a capacity vs. cycle number plot of the cell in (a).

Figure 5B:
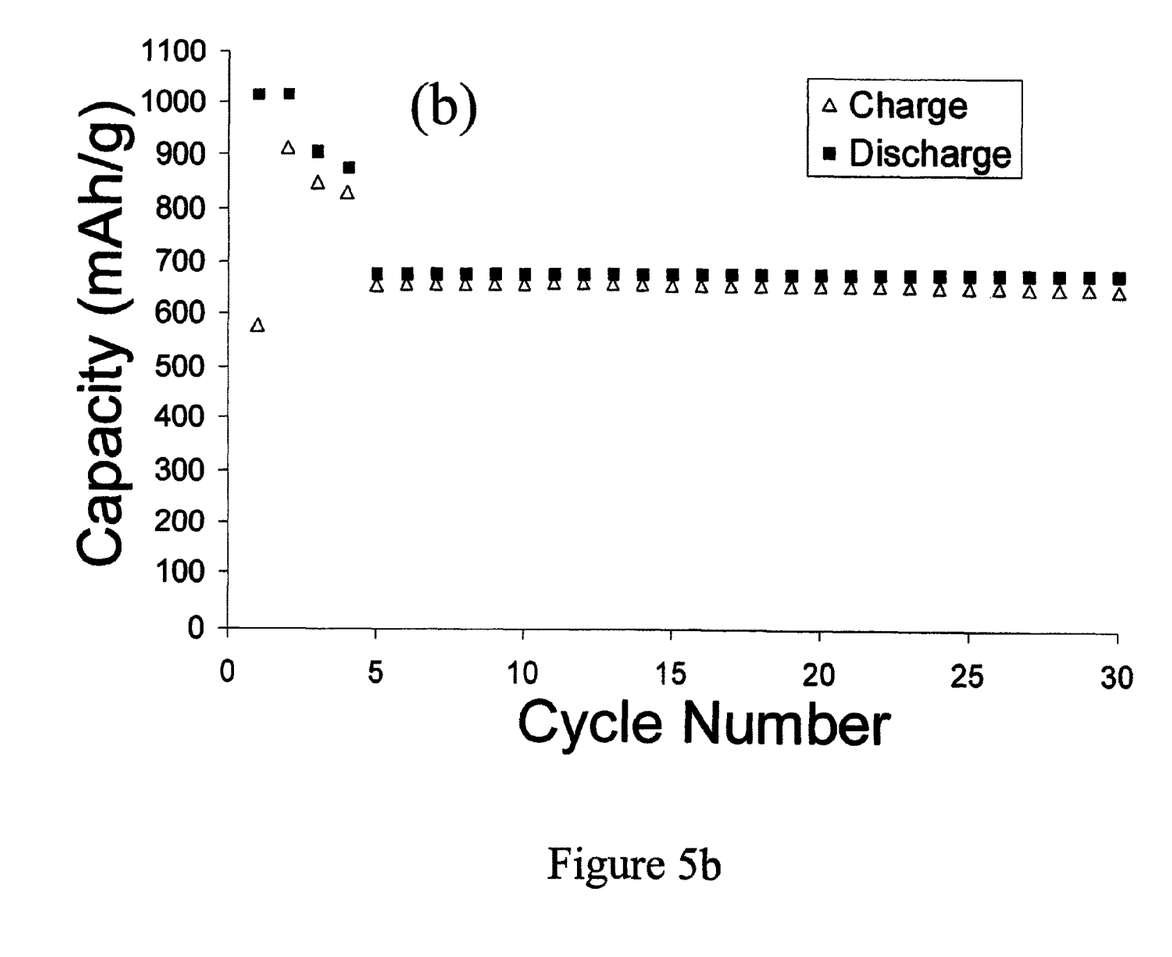

The experimental capacity of about 670 mAh/g obtained from the composite electrodeposited $Cu_6Sn_5$–Sn electrode (FIG. 5) for at least 30 cycles is significantly and surprisingly higher than that achieved from $Cu_6Sn_5$ electrodes alone ($Cu_6Sn_5$ has a theoretical capacity of 584 mAh/g), indicating that the electrode operates more effectively from two initial components ($Cu_6Sn_5$ and Sn) rather than one; during reaction with lithium a multi-component electrode will result, forming for example, components such as the ternary $Li_2CuSn$ composition, compositions within the solid solution $Li_{2+x}Cu_{1-x}Sn$ system (0<x<1), and phases within the binary $Li_xSn$ system (0<x<4.4); it is believed that the multi component electrode systems of the invention, most of which contain lithium during charge and discharge, serve to minimize lithium diffusion distances within the electrode during cell charge and discharge. The electrochemical capacity of the $Cu_6Sn_5$–Sn electrodes of this invention, as shown in FIG. 5, are surprisingly superior to the prior art as demonstrated by (1) ball-milled $Cu_6Sn_5$ electrodes reported by Kepler et al. in Electrochemical and Solid State Letters, Volume 2, Page: 307 (1999) that provided a rechargeable capacity of about 200 mAh/g, (2) sputtered thin film $Cu_6Sn_5$ electrodes reported by Kim et al. in the Journal of the Electrochemical Society, Volume 155, page A448 (2008) that provided a rechargeable capacity of about 350 mAh/g, and (3) electrodeposited $Cu_6Sn_5$ electrodes reported by Fan et al. in Electrochemical and Solid State Letters, Volume 11, page A195 (2008), that yielded a capacity between 500 and 450 mAh/g, i.e., all within the theoretical capacity limit of $Cu_6Sn_5$. Notwithstanding the drop in electrochemical capacity after 30 cycles (FIG. 5b), further improvements in the delivered capacity and cycling stability of multi-component copper-tin electrodes of this invention can be expected.

EXAMPLE 3

$Cu_6Sn_5$—Sn and $Cu_2Sb$—Sb films were deposited sequentially on stainless steel substrates (for X-ray diffraction analysis) and on copper foil substrates for the electrochemical measurements, using an electrochemical deposition protocol similar to that described in Example 2. Thin films containing Cu, Sb, and Sn were made by layered electrodeposition from two different solutions. The resulting films consisted of two layers from each solution, resulting in a composite described as "ABAB". The working electrode for all depositions was Cu foil. The reference electrode was a saturated calomel electrode. The counter electrode was platinum gauze.

Figure 6:
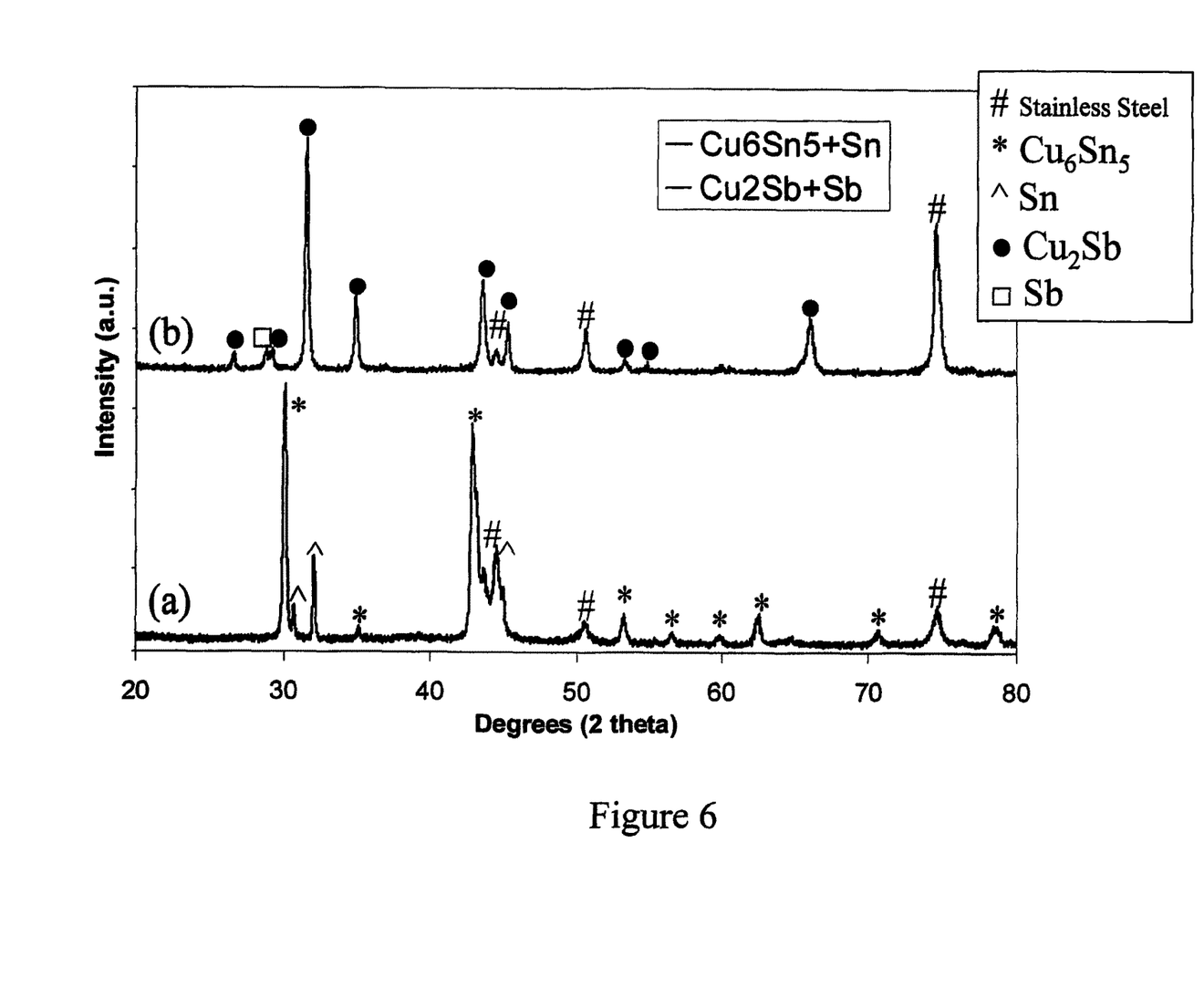
FIG. 6 depicts the X-ray diffraction patterns of (a) $Cu_6Sn_5$ and Sn products electrodeposited onto a stainless steel substrate from a 0.2 M $SnCl_2$, 0.02 M $CuCl_2$, and roughly 10 vol. % HCl solution, and (b) copper-antimonide and antimony products electrodeposited onto a stainless steel substrate from a 0.04 M $CuCl_2$, 0.02 M $SbCl_3$, and approximately 10 vol. % HCl solution.

Layer "A" was deposited from an aqueous solution containing 0.2 M $SnCl_2$, 0.02 M $CuCl_2$, and roughly 10 vol. % HCl. The deposition for each layer "A" was a galvanic square wave consisting of: [−30 mA (50 ms)/−1 mA (1 s)]×200. When this deposition was performed on a stainless steel substrate it was shown to contain mostly $Cu_6Sn_5$ with some additional Sn by X-ray diffraction (XRD), as depicted in FIG. 6a. After each "A" deposition a "B" deposition was initiated with the same working electrode but different solution. The "B" solution consisted of 0.04 M $CuCl_2$, 0.02 M $SbCl_3$, and approximately 10 vol. % HCl. Layer "B" was made by a galvanic square wave consisting of: [−10 mA (2 s)/0 mA (4 s)]×25. When this deposition was performed on a stainless steel substrate it was shown to contain mostly $Cu_2Sb$ with some additional Sb by XRD, as depicted in FIG. 6b.

Assuming deposition "A" produced $Cu_6Sn_5$ and deposition "B" produced $Cu_2Sb$, the combined theoretical mass of the layered composite, "ABAB", is about 0.83 mg. Expecting less than 100% coulombic efficiency for the depositions, this value was rounded down to 0.80 mg for capacity calculations.

Figure 7:
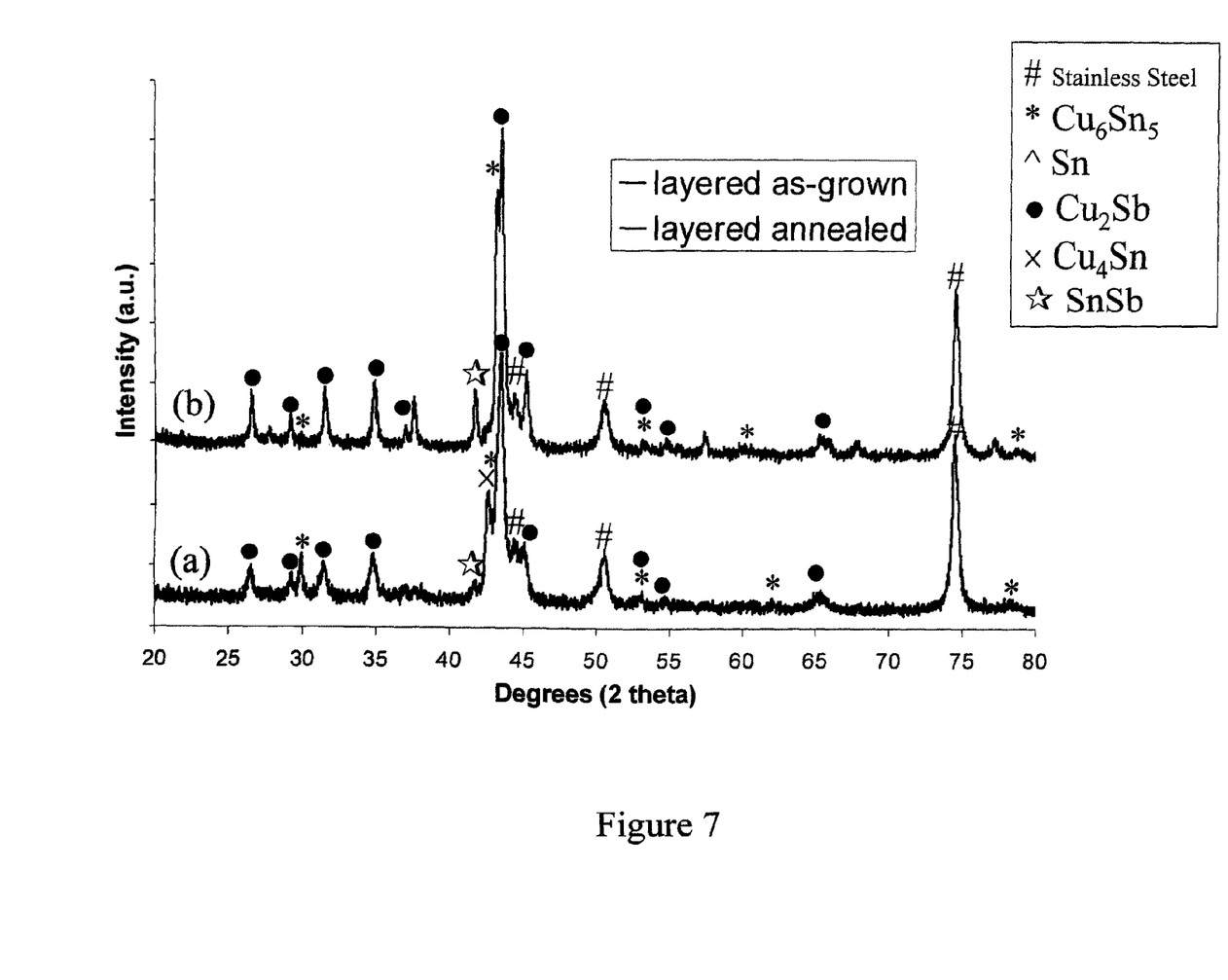
FIG. 7 depicts the X-ray diffraction patterns of an electrode containing Cu, Sn and Sb, created by the sequential electrodeposition of first, copper and tin on a stainless steel substrate and, subsequently, copper and antimony, the process being repeated twice, (a) as grown, and (b) after annealing at 150° C.

For comparison, one 'as-deposited' electrode was cycled in a coin cell and another was first annealed in an argon-filled glove box at about 150° C. for about 100 hours. The layered deposition was mimicked on a stainless steel substrate for XRD analysis before and after annealing (FIG. 7 a and b). Both electrodes on Cu were assembled into coin cells (size 2032) in a helium-filled glove box. The electrodeposited, layered, composite electrodes were cycled vs. metallic lithium in an electrolyte of 1.2 M $LiPF_6$ in ethylene carbonate and ethyl methyl carbonate (about 3:7 w/w). Cells were cycled galvanostatically at about 0.08 mA in the voltage window of about 0-1.5 V.

Figure 8:
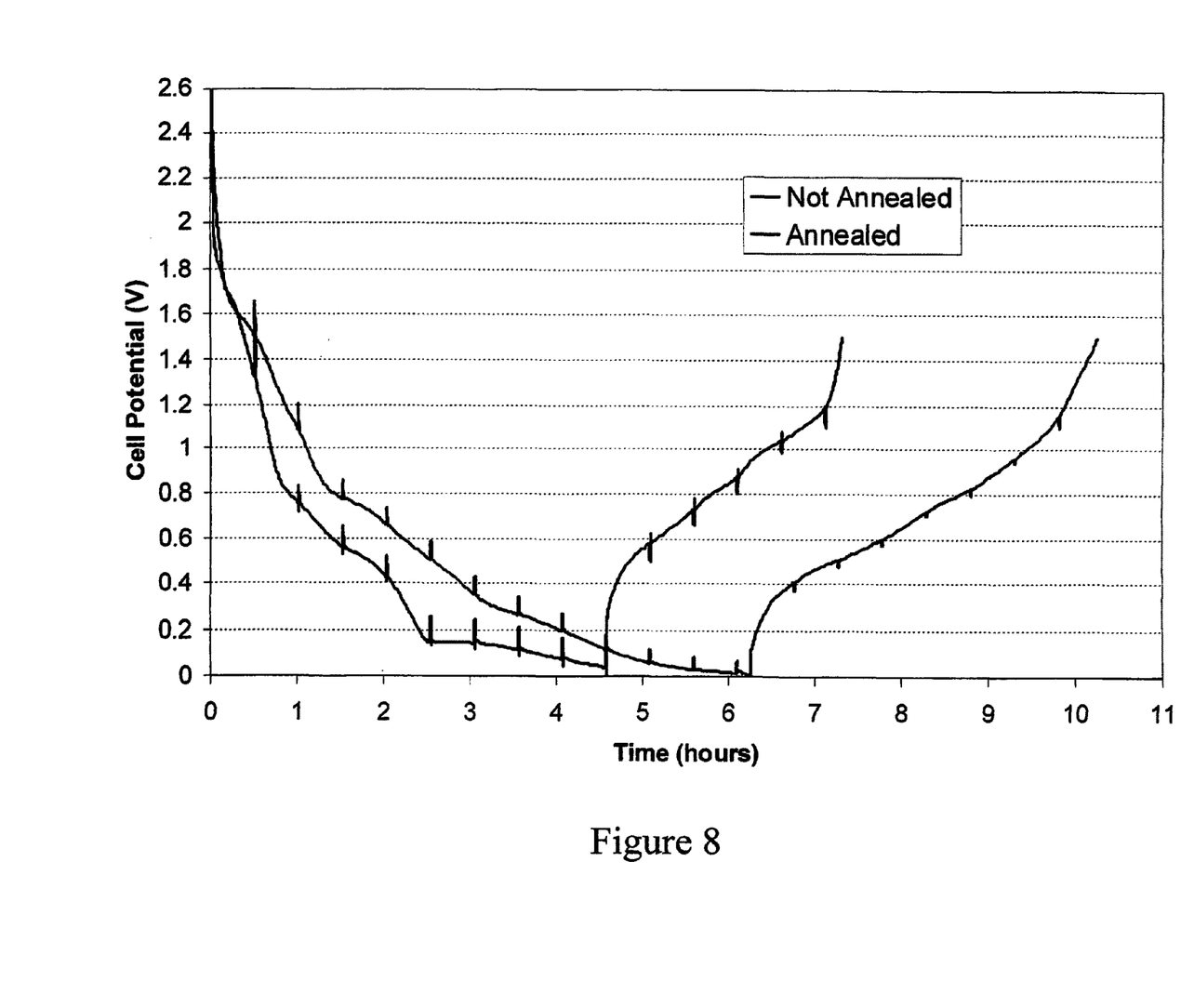
FIG. 8 depicts the first discharge/charge cycle of a lithium cell with a lithium metal electrode and an electrodeposited Cu/Sn/Sb counter electrode formed by electrodeposition of Cu, Sn and Sb on a copper current collector, (a) without annealing of the Cu, Sn, Sb electrode and, (b), after annealing the electrode at 150° C.
Figure 9:
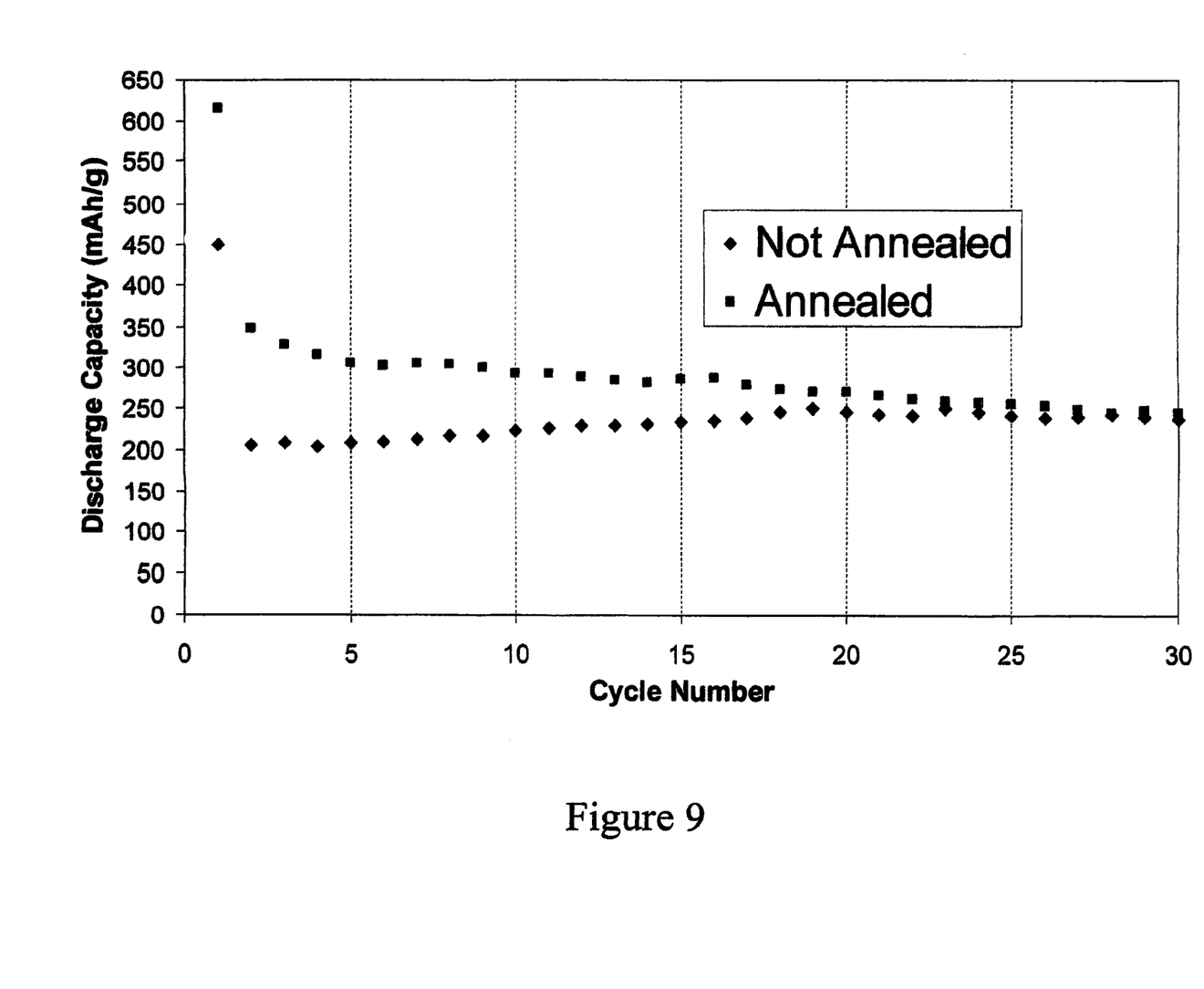
FIG. 9 depicts a comparison of the capacity vs. cycle number plots obtained from lithium cells with unannealed and annealed, electrodeposited Cu, Sn, Sb electrodes.

FIG. 8 depicts the voltage profiles of the initial discharge/charge cycle of lithium cells containing a lithium metal electrode and an as-grown electrodeposited $Cu_6Sn_5$—Sn/$Cu_2Sb$—Sb counter electrode and an annealed electrode. The data demonstrate that the annealing process provides a higher capacity electrode during the first cycle. The capacity vs. cycle number plots in FIG. 9, however, demonstrate that although the annealed electrode provides superior capacity during the early cycles, the cycling stability of the unannealed electrode is steadier; after 30 cycles both unannealed and annealed electrodes deliver approximately 250 mAh/g. By analogy to Example 2, significantly improved electrochemical performance can be expected from the multi-component composite electrodes when three-dimensional, copper foam current collectors that offer an intrinsically-higher current collecting surface, rather than the two-dimensional stainless steel substrates, are used in the electrochemical cells.

EXAMPLE 4

The electrochemical properties of lithium cells containing laminated $Cu_6Sn_5$, SnSb and $Cu_2Sb$ electrodes that had been constructed using $Cu_6Sn_5$, SnSb, and $Cu_2Sb$ powders closely in accordance with the method described in Example 1, were compared with those of cells containing the electrodeposited multi-component $Cu_6Sn_5$—Sn and $Cu_2Sb$—Sb electrodes described in Example 3. Equal amounts (by mass) of $Cu_6Sn_5$, $Cu_2Sb$, and SnSb, made by direct reaction of a stoichiometric mixture of the elements at high temperature, were ground together with a mortar and pestle. The resulting powder was suspended in ethanol and the particles reduced in size by mixing with yttria-stabilized zirconia beads on a shaker mill. The resulting slurry mixture was vacuum-filtered and rinsed with methanol. The solid was then dried in a vacuum oven at about 75° C.

Laminate electrodes were made from the blended powders as follows: Laminate slurries containing about 80% active material, about 10% acetylene black, and about 10% PVdF binder in N-Methyl-2-pyrrolidone (NMP) were cast onto Cu foil substrates and dried in air at about 75° C. for about 1.5 hours before coin cell assembly in a helium-filled glove box. The loading of electrochemically active material in each laminated electrode was approximately 4.7 mg/cm². The laminates were cycled vs. metallic lithium in an electrolyte of 1.2 M $LiPF_6$ in ethylene carbonate and ethyl methyl carbonate (about 3:7 w/w). Cells were cycled galvanostatically at about 0.3 mA in the voltage window of about 0-1.5 V.

Figure 10:
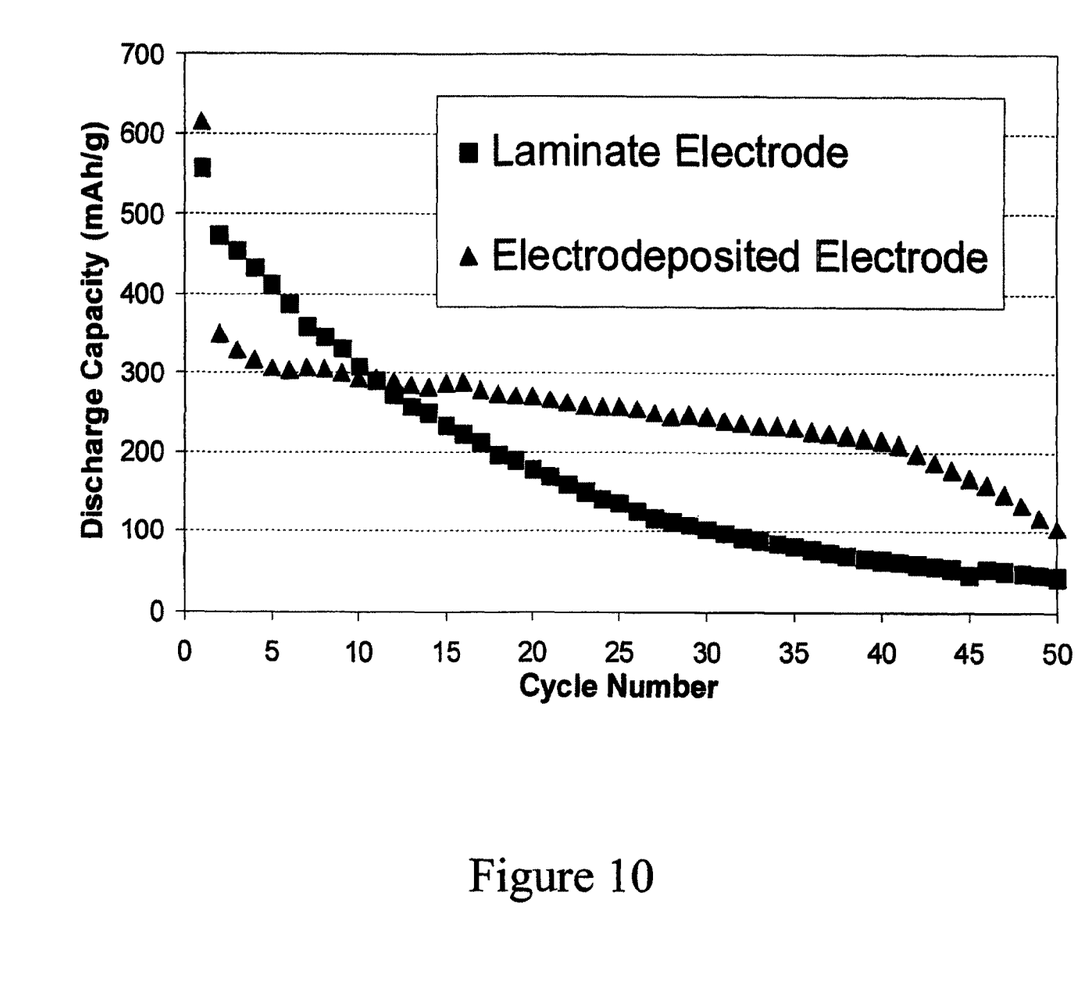
FIG. 10 depicts a comparison of the capacity vs. cycle number plots obtained from lithium cells with (a) a conventional laminated Cu, Sn, Sb electrode constructed from $Cu_6Sn_5$, SnSb, and $Cu_2Sb$ powders, and (b) an annealed, electrodeposited Cu, Sn, Sb electrode.

Cells with the laminated electrodes were discharged at half the rate (C/6) of the cells containing the electrodeposited electrodes. The discharge capacity vs. cycle number plots of the two cells are compared in FIG. 10. The data indicate, therefore, that from the viewpoints of cycling stability, rate, and capacity after 10 cycles, electrodeposition is the preferred method for fabricating the multi-component electrodes of this invention.

Figure 11:
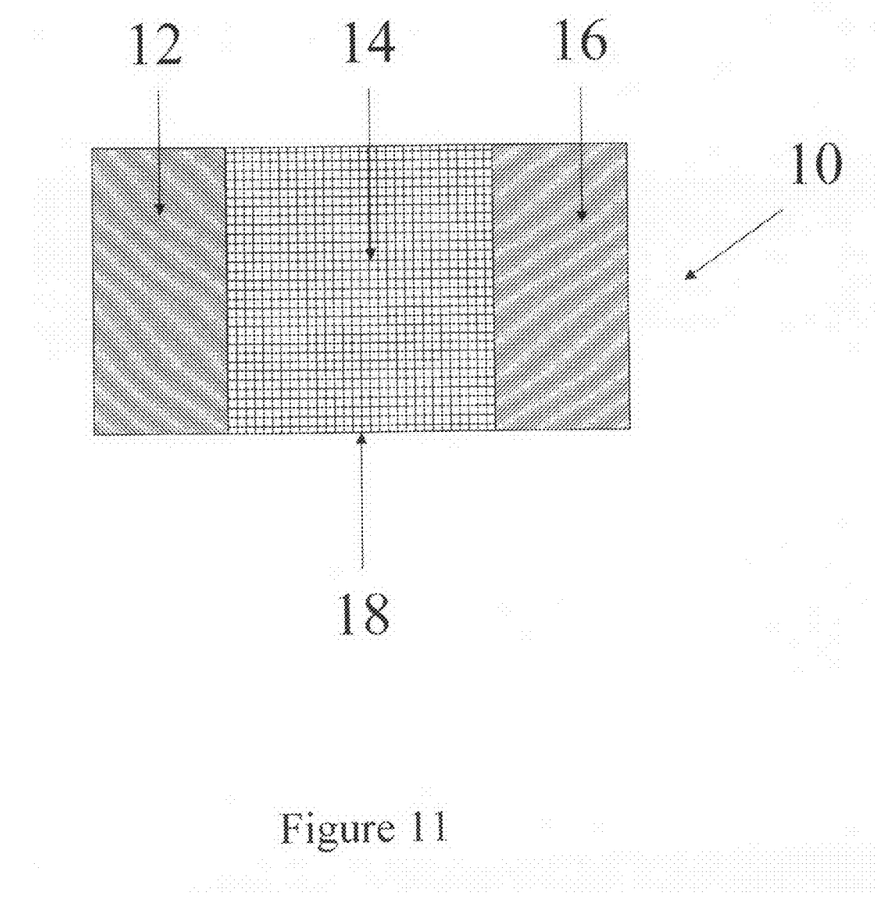
FIG. 11 is a schematic representation of an electrochemical cell.
Figure 12:
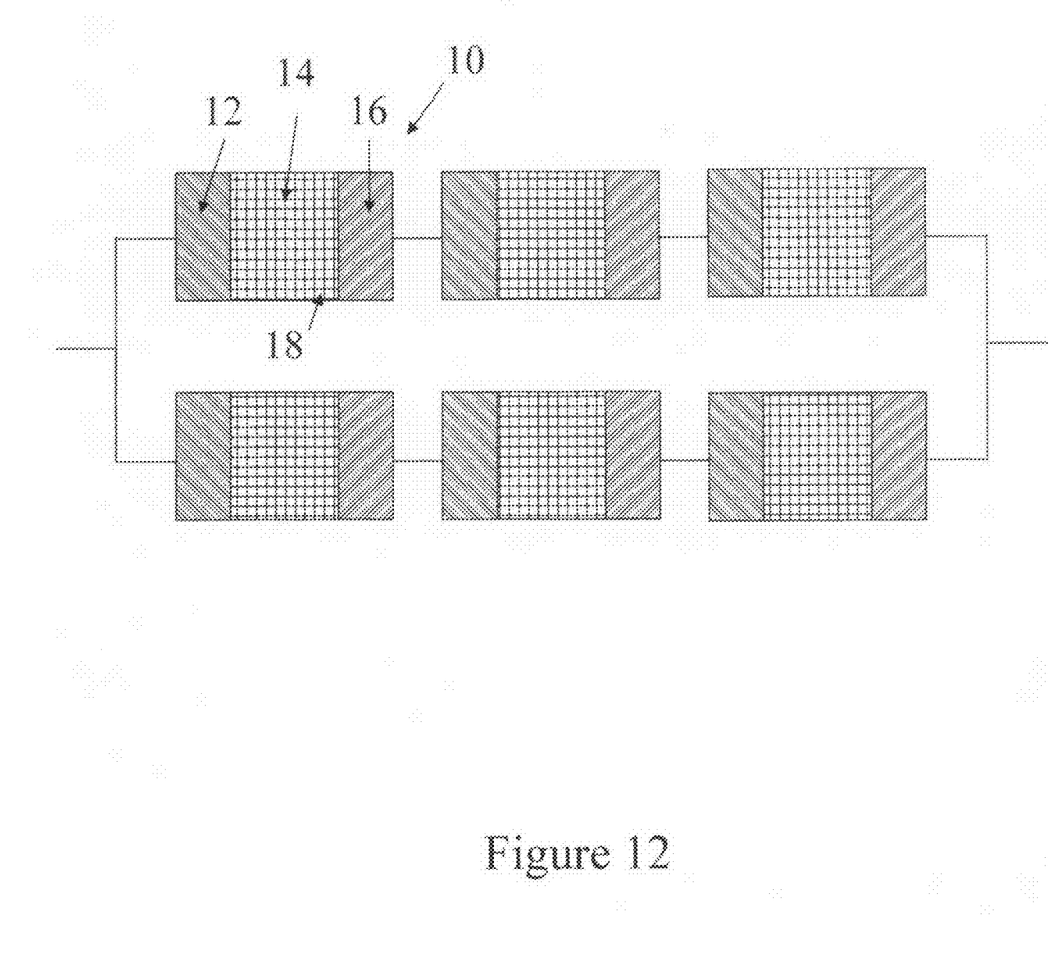
FIG. 12 is a schematic representation of a battery consisting of a plurality of cells connected electrically in series and in parallel.

This invention relates, therefore, to an intermetallic negative electrode for a non-aqueous electrochemical lithium cell 10 having a negative electrode 12 separated from a positive electrode 16 by an electrolyte 14, all contained in an insulating housing 18 with suitable terminals (not shown) being provided in electronic contact with the negative electrode 12 and the positive electrode 16, as depicted schematically in FIG. 11, and to batteries with a plurality of cells connected either in series and/or in parallel, as shown schematically in FIG. 12. The invention covers, in particular, various composite intermetallic electrodes comprising two or more metal or metalloid elements, M(1), M(2), M(3) . . . etc at least one of which can react with lithium to form binary $Li_xM(1)$, ternary $Li_xM(1)M(2)$, quaternary $Li_xM(1)M(2)M(3)$ or higher order compounds in combination with one or more other metals that are essentially inactive toward lithium and act predominantly, but not necessarily exclusively, to the electronic conductivity of, and as current collection agent for, the electrode. Binders and other materials normally associated with both the electrolyte and the negative and positive electrodes are well known in the art and are not described herein, but are included as is understood by those of ordinary skill in this art.

While there has been disclosed what is considered to be preferred embodiments of the present invention, it is understood that various changes in the details may be made without departing from the spirit, or sacrificing any of the advantages of the present invention. In this respect, there are numerous metals and metalloids that can be selected that react with lithium besides Sn and Sb and also other inactive metals besides copper that can be used to enhance the electronic conductivity between the active metal or intermetallic particles of the electrode during electrochemical cycling.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context. It is also understood that additional improvements in the composition, capacity and stability of the electrodes and to the overall cell design can be expected to be made in the future, for example, by improving and optimizing the processing techniques whereby multi-component intermetallic materials, as defined herein, can be fabricated and incorporated as electrodes in electrochemical lithium cells.

Specific embodiments of the invention in which an exclusive property or privilege is claimed are defined as follows:

1. A negative electrode for a non-aqueous lithium cell comprising a multi-component material electrochemically deposited directly on a porous metallic copper foam current collector substrate such that the multi-component material is in direct contact with the substrate, the multi-component material containing a first component that comprises at least one metallic or metalloid element that can react with lithium to form a binary, ternary, quaternary or higher order compound; and a second component comprising one or more additional metallic element that does not readily react with lithium; wherein the multi-component material comprises a combination of materials (a) a combination of $Cu_6Sn_5$ and Sn, and (b) a combination of $Cu_2Sb$ and Sb.

2. The electrode of claim 1, in which the multi-component material provides an operating potential of about 0.05 to about 2.0 V vs. metallic lithium.

3. The electrode of claim 1, in which the electrochemically deposited components individually are crystalline to X-rays.

4. The electrode of claim 3, in which the structures of the crystalline components are ordered.

5. The electrode of claim 3, in which the structures of the crystalline components are partially disordered.

6. The electrode of claim 3, in which the structures of the crystalline components are disordered.

7. The electrode of claim 1, in which the electrochemically deposited components individually are poorly crystalline to X-rays.

8. The electrode of claim 7, in which the structures of the poorly crystalline components are ordered.

9. The electrode of claim 7, in which the structures of the poorly crystalline components are partially disordered.

10. The electrode of claim 7, in which the structures of the poorly crystalline components are disordered.

11. The electrode of claim 1, in which the electrochemically deposited components individually are amorphous to X-rays.

12. The electrode of claim 1, in which the first and second components of the electrode material comprise primary particles, which on average, are less than about 1000 nm in size.

13. The electrode of claim 12, in which the primary particles are, on average, less than about 500 nm in size.

14. The electrode of claim 12, in which the primary particles are, on average, less than about 100 nm in size.

15. An electrochemical cell comprising the electrode of claim 1, a positive electrode, and an electrolyte therebetween.

16. A battery comprising a plurality of electrochemical cells of claim 15 arranged in parallel, in series, or both.

17. A negative electrode for a non-aqueous lithium cell comprising a multi-component material electrochemically deposited directly on a porous copper foam current collector substrate such that the multi-component material is in direct contact with the substrate, the multi-component material comprising a combination of materials (a) a combination of $Cu_6Sn_5$ and Sn, and (b) a combination of $Cu_2Sb$ and Sb.

18. An electrochemical cell comprising the electrode of claim 17, a positive electrode, and an electrolyte therebetween.

19. A battery comprising a plurality of electrochemical cells of claim 18 arranged in parallel, in series, or both.

* * * * *